United States Patent
Khaled et al.

(10) Patent No.: US 10,371,036 B2
(45) Date of Patent: Aug. 6, 2019

(54) SYSTEM AND METHOD FOR MONITORING PARTICULATE FILTER CONDITION IN AN AFTERTREATMENT SYSTEM

(71) Applicant: Cummins Emission Solutions, Inc., Columbus, IN (US)

(72) Inventors: Nassim Khaled, Columbus, IN (US); Michael Haas, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 53 days.

(21) Appl. No.: 15/556,997

(22) PCT Filed: Feb. 16, 2016

(86) PCT No.: PCT/US2016/017999
§ 371 (c)(1),
(2) Date: Sep. 8, 2017

(87) PCT Pub. No.: WO2016/144492
PCT Pub. Date: Sep. 15, 2016

(65) Prior Publication Data
US 2018/0051616 A1 Feb. 22, 2018

Related U.S. Application Data

(60) Provisional application No. 62/131,622, filed on Mar. 11, 2015.

(51) Int. Cl.
*F01N 3/20* (2006.01)
*F01N 9/00* (2006.01)
(Continued)

(52) U.S. Cl.
CPC ............ *F01N 11/002* (2013.01); *F01N 3/023* (2013.01); *F01N 3/035* (2013.01); *F01N 3/2066* (2013.01);
(Continued)

(58) Field of Classification Search
CPC .... F01N 11/00; F01N 11/002; F01N 13/0093; F01N 3/023; F01N 3/035; F01N 3/2066;
(Continued)

(56) References Cited

U.S. PATENT DOCUMENTS 6,863,139 B2  3/2005 Egami et al.
7,119,454 B1 10/2006 Chiao
(Continued)

FOREIGN PATENT DOCUMENTS

CN      102069795      11/2013
WO   WO 2014/0109887 A2   7/2014

OTHER PUBLICATIONS

International Search Report and Written Opinion from corresponding PCT Application No. PCT/US2016/017999, dated Apr. 22, 2016, 12 pages.
(Continued)

*Primary Examiner* — Brandon D Lee
(74) *Attorney, Agent, or Firm* — Foley & Lardner LLP

(57) ABSTRACT

A system and method for monitoring filtering condition in an aftertreatment system comprises measuring a first pressure upstream of a first particulate filter in the aftertreatment system. A second pressure downstream of the first particulate filter and upstream of a second particulate filter in the aftertreatment system is measured. A third pressure downstream of the second particulate filter is also measured. A difference in pressure between the second pressure and the third pressure is determined which corresponds to a filtering condition of the first particulate filter. The difference in pressure is compared with a predetermined threshold. If the difference in pressure exceeds the predetermined threshold the failure of the first particulate filter is identified.

23 Claims, 7 Drawing Sheets

(51) Int. Cl.
*F01N 11/00* (2006.01)
*F01N 13/00* (2010.01)
*F01N 3/023* (2006.01)
*F01N 3/035* (2006.01)

(52) U.S. Cl.
CPC ............. *F01N 9/002* (2013.01); *F01N 11/00* (2013.01); *F01N 13/0093* (2014.06); *F01N 2550/04* (2013.01); *F01N 2560/08* (2013.01); *F01N 2900/1606* (2013.01); *Y02T 10/24* (2013.01); *Y02T 10/47* (2013.01)

(58) Field of Classification Search
CPC .. F01N 9/002; F01N 2550/04; F01N 2560/08; F01N 2900/1606; Y02T 10/24; Y02T 10/47

See application file for complete search history.

(56) References Cited

U.S. PATENT DOCUMENTS

| | | |
|---|---|---|
| 7,753,147 B2 | 7/2010 | Usoro |
| 8,186,466 B2 | 5/2012 | Verbrugge et al. |
| 8,444,527 B2 | 5/2013 | Usoro |
| 8,860,439 B2 | 10/2014 | Kimata et al. |
| 8,870,987 B2 | 10/2014 | Takaoka et al. |
| 8,915,119 B2 | 12/2014 | Ueno et al. |
| 8,919,187 B2 | 12/2014 | Ichimasa |
| 8,925,370 B2 | 1/2015 | Nishijima |
| 8,943,809 B2 | 2/2015 | Aoki et al. |
| 8,943,814 B2 | 2/2015 | Shibata et al. |
| 8,955,307 B2 | 2/2015 | Yahata et al. |
| 2005/0150220 A1* | 7/2005 | Johnson ................... F01N 3/025 60/295 |
| 2006/0153761 A1* | 7/2006 | Bandl-Konrad ... B01D 53/9431 423/239.1 |
| 2006/0196167 A1* | 9/2006 | Odajima ................ F01N 11/002 60/277 |
| 2007/0137177 A1 | 6/2007 | Kittelson et al. |
| 2010/0101409 A1 | 4/2010 | Bromberg et al. |
| 2011/0072789 A1 | 3/2011 | Konstandopoulos et al. |
| 2014/0020075 A1 | 1/2014 | Bhagavatula et al. |
| 2014/0023576 A1* | 1/2014 | Yezerets ............ B01D 46/0086 423/213.2 |
| 2014/0069081 A1 | 3/2014 | Tylutki et al. |

OTHER PUBLICATIONS

International Search Report and Written Opinion from PCT Application No. PCT/US2015/046552, dated Nov. 27, 2015, 7 pages.

* cited by examiner

SYSTEM AND METHOD FOR MONITORING PARTICULATE FILTER CONDITION IN AN AFTERTREATMENT SYSTEM

The present application claims priority to and the benefit of PCT Application No. PCT/US2016/017999, filed Feb. 16, 2016, which claims priority to and the benefit of U.S. Provisional Patent Application No. 62/131,622, filed Mar. 11, 2015 and entitled "System and Method for Monitoring Particulate Filter Condition in an Aftertreatment System," the entire disclosure of which is incorporated herein by reference.

CROSS REFERENCE TO RELATED APPLICATIONS

The present application claims priority to and benefit of U.S. Provisional Patent Application No. 62/131,622, filed Mar. 11, 2015 and entitled "System and Method for Monitoring Particulate Filter Condition in an Aftertreatment System," the entire disclosure of which is incorporated herein by reference.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and the $NO_2$ in some fraction) into harmless nitrogen gas ($N_2$) and water vapor ($H_2O$) in the presence of ammonia ($NH_3$).

Many aftertreatment systems include a particulate filter (e.g., a diesel particulate filter) positioned upstream of the SCR system. The particulate filter is configured to filter particulate matter, for example soot entrained within the exhaust gas flowing through the aftertreatment system to meet particulate emissions regulations. Exhaust emission regulations require monitoring of the particulate filter to ensure that the particulate matter emissions meet regulation standards. Malfunctioning of the particulate filter, for example a crack in the particulate filter can cause excessive particulate matter to flow to downstream aftertreatment components (e.g., the SCR system) and into the environment.

Various conventional aftertreatment systems include a particulate matter sensor positioned downstream of the particulate filter. The particulate matter sensor can include a resistive sensor which monitors the amount of particulate matter flowing downstream of the particulate filter. Such resistive particulate matter sensors generally have low durability (e.g., operational lifetime on a vehicle of less than 10,000 miles), are susceptible to contaminants and have a low signal to noise ratio. Furthermore, the data obtained from particulate matter sensors is complex and difficult to analyze for determining the actual concentration of particulate matter flowing downstream of the particulate filter.

SUMMARY

Embodiments described herein relate generally to systems and methods of diagnosing the performance of a particulate filter, and in particular to aftertreatment systems that include a second particulate filter and pressure sensor positioned downstream of a main particulate filter of the aftertreatment system. A pressure difference across the second particulate filter, which corresponds to a performance of the main particulate filter, may be monitored.

In a first set of embodiments, a method for monitoring filtering condition in an aftertreatment system comprises measuring a first pressure difference across a first particulate filter in the aftertreatment system. A second pressure difference across a second particulate filter positioned downstream of the first particulate filter is also measured. Optionally, a third pressure downstream of the second particulate filter is measured. A filtering condition of the first particulate filter is determined based on at least one of the first pressure difference, the second pressure difference and the third pressure. In one embodiment, the second pressure difference is compared with a predetermined threshold. If the second pressure exceeds a predetermined threshold, the first particulate filter is identified as being failed.

In a second set of embodiments, an aftertreatment system includes a first particulate filter configured to receive an exhaust gas containing particulate matter and filter the exhaust gas to remove at least a portion of the particular matter from the exhaust gas. The exhaust gas has a first pressure upstream of the first particulate filter and a second pressure downstream of the first particulate filter. A second particulate filter is positioned downstream of the second pressure sensor. The second particulate filter is configured to receive at least a portion of the filtered exhaust gas from the first particular filter and filter any remaining particulate matter from the exhaust gas. The exhaust gas has a third pressure downstream of the second particulate filter. A SCR system is positioned downstream of the third pressure sensor. The first pressure, the second pressure and the third pressure correspond to a filtering condition of the first particulate filter and the second particulate filter. In particular embodiments, a difference between the second pressure and the third pressure corresponds to a filtering efficiency of the first particulate filter. In one embodiment, a difference between the second pressure and the third pressure exceeding a predetermined threshold corresponds to a failure of the first particulate filter.

In a third set of embodiments, a method for monitoring filtering condition in an aftertreatment system comprises measuring a first pressure difference across a first particulate filter in the aftertreatment system. A second pressure difference across a second particulate filter included in the aftertreatment system is measured. The second particulate filter is positioned downstream of the first particulate filter. A filtering condition of the first particulate filter is determined based on the first pressure difference and the second pressure difference.

In a fourth set of embodiments, a method for detecting an engine failure comprises flowing an exhaust gas produced by the engine through a particulate filter included in an aftertreatment system. A pressure difference across the particulate filter is measured. An amount of particulate matter entrained in the exhaust gas is determined based on the pressure difference. The amount of particulate matter is compared with a predetermined threshold. A failure of the engine is identified if the amount of particulate matter exceeds the predetermined threshold.

In a fifth set of embodiments, a method for monitoring filtering condition in an aftertreatment system comprises measuring a first pressure upstream of a first particulate filter of the aftertreatment system. A second pressure downstream of the first particulate filter and upstream of a second particulate filter of the aftertreatment system is also measured. A third pressure downstream of the second particulate filter is measured. It is determined if at least one of the first pressure, the second pressure, and a difference between the first pressure and the second pressure is within a predetermined range. If at least one of the first pressure, the second pressure, and a difference between the first pressure and the second pressure is within the predetermined range, it is determined if the third pressure corresponds to a failure of the first particulate filter.

In a sixth set of embodiments, a control circuitry for monitoring a filtering condition of an aftertreatment system comprises a controller. The controller is configured to be operatively coupled to the aftertreatment system. The controller is configured to measure a first pressure upstream of a first particulate filter of the aftertreatment system. The controller measures a second pressure downstream of the first particulate filter and upstream of a second particulate filter of the aftertreatment system. Furthermore, the controller measures a third pressure downstream of the second particulate filter. The controller determines if at least one of the first pressure, the second pressure, and a difference between the first pressure and the second pressure is within a predetermined range. If at least one of the first pressure, the second pressure, and a difference between the first pressure and the second pressure is within the predetermined range, the controller determines if the third pressure corresponds to a failure of the first particulate filter.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
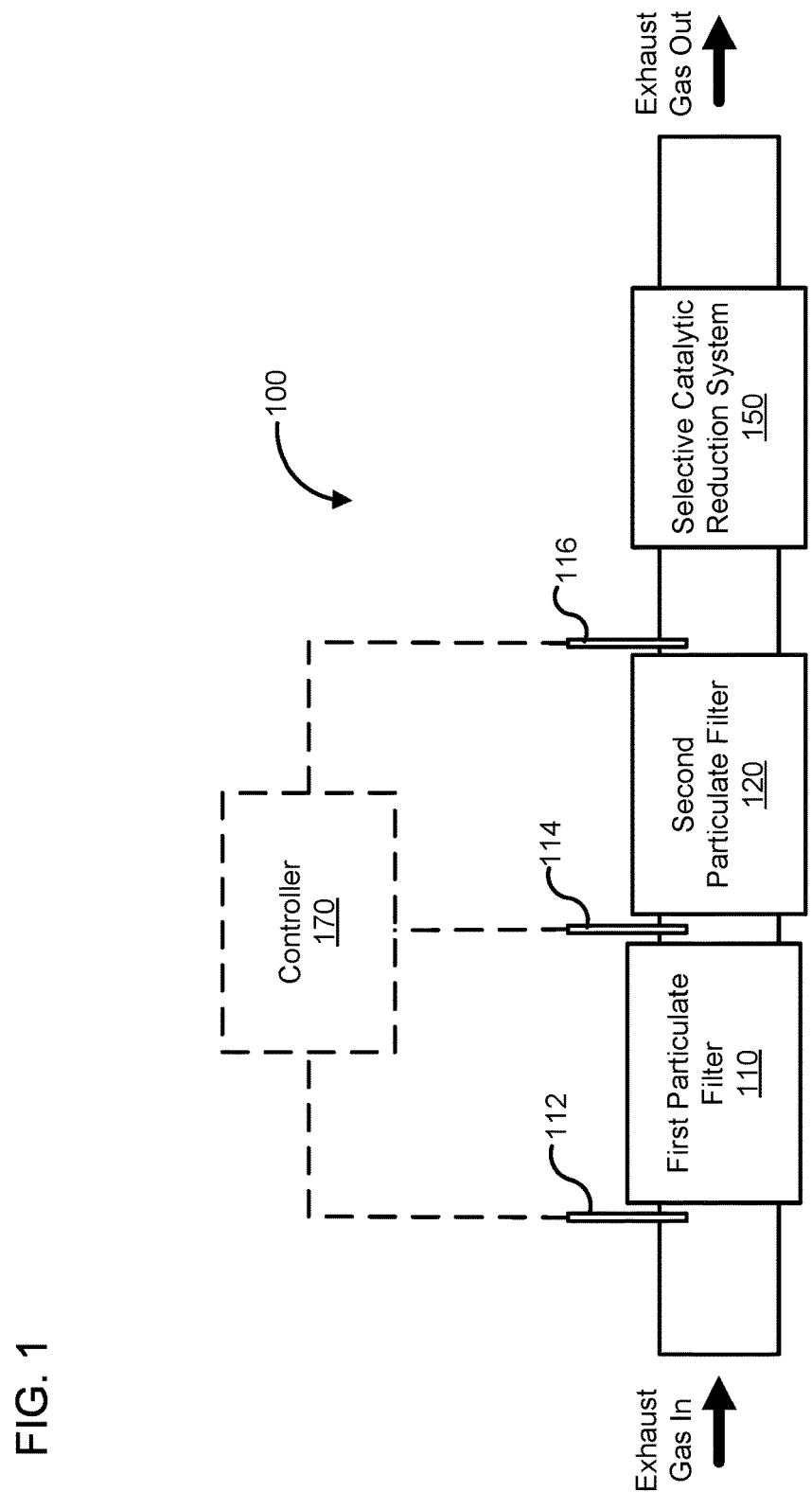
FIG. 1 is a schematic block diagram of an aftertreatment system that includes a first particulate filter and a second particulate filter positioned downstream of the first particulate filter, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods of diagnosing the performance of a particulate filter, and in particular to aftertreatment systems that include a second particulate filter and pressure sensor positioned downstream of a main particulate filter of the aftertreatment system. A pressure difference across the second particulate filter, corresponding to a performance of the main particulate filter, may therefore be monitored.

Various embodiments described herein may provide a number of benefits. For example, the positioning of a second particulate filter downstream of the main particulate filter of an aftertreatment system and measuring the pressure across the second particulate filter provides for determining a filtering condition (e.g., a filtering efficiency) of the main particulate filter. Additionally, a pressure sensor is more durable than the particulate matter sensors used for monitoring particulate filters in conventional aftertreatment systems. Various embodiments also increase the fidelity and reliability of particulate filter performance diagnosis by using pressure sensor data, which is easier to analyze than the resistance data obtained from particulate matter sensors. Still further, various embodiments may result in reduced maintenance costs by eliminating the particulate matter sensor, which requires frequent maintenance and replacement from the aftertreatment system.

FIG. 1 is a schematic block diagram of an aftertreatment system 100 according to an embodiment. The aftertreatment system 100 includes a first particulate filter 110, a second particulate filter 120, a first pressure sensor 112, a second pressure sensor 114, a third pressure sensor 116, an SCR system 150 and, optionally, a controller 170.

The first particulate filter 110 is configured to receive an exhaust gas (e.g., a diesel exhaust gas) from an engine (e.g., an IC engine) and filter the particulate matter from the exhaust gas. In some embodiments, in which the exhaust gas includes a diesel exhaust gas, the first particulate filter 110 includes a diesel particulate filter. The first particulate filter 110 can include any suitable filter (e.g., a diesel particulate filter) configured to filter and remove any particulate matter entrained within the exhaust gas flow, such that the exhaust gas expelled into the environment meets emissions regulations. Such particulate matter can include, for example, dust, soot, organic particles, crystals, or any other solid particulates present in the exhaust gas. The first particulate filter 110 can be the main particulate filter of the aftertreatment system 100, for example configured to perform substantially all of the filtering of the particulate matter from the exhaust gas.

Any suitable filter element can be used such as, for example, an acrylonitrile butadiene styrene (ABS) filter element, any other suitable filter element or a combination thereof. The filter element can have any suitable pore size, for example, about 10 microns, about 5 microns, or about 1 micron. In some embodiments, the first particulate filter 110 can be catalyzed.

The exhaust gas has a first pressure upstream of the first particulate filter 110. As the exhaust gas flows through the first particulate filter 110, the exhaust gas experiences a drop in pressure such that the exhaust gas has a second pressure downstream of the first particulate filter 110. The drop in pressure correlates to the filtering condition of the first particulate filter 110. A fresh or new first particulate filter 110 will offer minimal resistance to the flow of the exhaust gas. As the first particulate filter 110 traps particulate matter from the exhaust gas, the amount of particulate matter in the first particulate filter 110 increases over time, and the first particulate filter 110 gets increasingly clogged. This leads to an increase in the back pressure exerted by the first particulate filter 110 on the exhaust gas over time.

Thus, the resistance to the flow of exhaust gas increases through the first particulate filter 110 over time, which correlates to an increasing difference in pressure between the first pressure and the second pressure. In this manner, the difference between the first pressure and the second pressure can be used to determine the filtering condition of the first particulate filter 110 and determine when the first particulate filter 110 needs to be changed, recharged or otherwise regenerated.

The first pressure sensor 112 is positioned upstream of the first particulate filter 110. The first pressure sensor 112 is configured to measure the first pressure of the exhaust gas. The second pressure sensor 114 is positioned downstream of the first particulate filter 110. The second pressure sensor 114 is configured to measure the second pressure of the exhaust gas.

The second particulate filter 120 is positioned downstream of the second pressure sensor 114. The second particulate filter 120 is configured to receive at least a portion of the filtered exhaust gas from the first particulate filter 110 and filter any remaining particulate matter form the exhaust gas. As the exhaust gas passes through the second particulate filter 120, the exhaust gas experiences a further drop in pressure such that the exhaust gas has a third pressure downstream of the second particulate filter 120. In particular embodiments, in which the exhaust gas includes a diesel exhaust gas, the second particulate filter 120 can include a diesel particulate filter.

In particular embodiments, the second particulate filter 120 can be catalyzed. In some embodiments, the second particulate filter 120 has a second cross-section or other size which is smaller than a first cross-section or other size of the first particulate filter 110. In other embodiments, the first cross-section of the first particulate filter 110 and the second cross-section of the second particulate filter 120 can be equal. For example, the second particulate filter 120 can be substantially the same as the first particulate filter 110. In such embodiments, the second particulate filter 120 can, for example be used as a backup filter in situations where the first particulate filter 110 fails.

A third pressure sensor 116 is positioned downstream of the second particulate filter 120. The third pressure sensor 116 is configured to measure the third pressure of the exhaust gas. The first pressure, the second pressure and the third pressure can correspond to a filtering condition of the first particulate filter 110 and the second particulate filter 120. As described earlier, a difference in pressure between the first pressure and the second pressure can be used to determine the filtering condition of the first particulate filter 110. Similarly, a difference in pressure between the second pressure and the third pressure can be used to determine a filtering condition of the second particulate filter 120.

The difference in pressure between the second and the third pressure can also be used to determine a filtering condition of the first particulate filter 110. Expanding further, during normal operation of the first particulate filter 110, a substantial portion of the particulate matter entrained in the exhaust gas is trapped by the first particulate filter 110. As used herein, the term "substantial portion" implies greater than 50% of the particulate matter (e.g., 50%, 60%, 70%, 80%, 90% or 95% of the particulate matter). Thus, there will be a significant pressure drop between the first pressure and the second pressure.

The exhaust gas downstream of the first particulate filter 110 is substantially free of the particulate matter. Thus, exhaust gas relatively free of particulate matter enters the second particulate filter 120 during normal operation of the first particulate filter 110. The clean exhaust gas does not contribute or minimally contributes to the clogging of the second particulate filter 120. Therefore, the pressure difference between the second pressure and third pressure remains small and substantially constant, as long as the first particulate filter 110 is functioning normally.

While, the filtering condition of the first particulate filter 110 can be determined by observing the pressure difference between the first pressure and the second pressure, catastrophic failure of the first particulate filer 110, for example a crack in the first particulate filter 110, cannot be determined by observing the difference between the first pressure and the second pressure. In such instances, there will be a drop in pressure between the first pressure and the second pressure which will remain relatively constant. This is because the exhaust gas can pass relatively unimpeded through the crack without experiencing any significant drop in pressure. However, a relatively large portion (e.g., an amount exceeding emission regulations) of the particulate matter will flow through the first particulate filter 110 and into the second particulate filter 120.

The large amount of the particulate matter flowing into the second particulate filter 120 will contribute to significant clogging of the second particulate filter 120. As the second particulate filter 120 clogs, a backpressure exerted by the second particulate filter 120 on the exhaust gas increases. This leads to an increase in the difference between the second pressure and the third pressure. In this manner, a difference between the second pressure and the third pressure can correspond to a filtering condition of the first particulate filter 110. In particular embodiments, the difference between the second pressure and the third pressure exceeding a predetermined threshold can correspond to a failure of the first particulate filter 110.

In still other embodiments, an absolute value of the third pressure sensor 116 can be used to determine if the first particulate filter 110 has failed. For example, it can be determined if the second pressure, a difference between the first pressure and the second pressure, or a differential pressure across the first particulate filter 110 is within a predetermined range. If the value is within the predetermined range, the absolute value of the third pressure can be monitored to determine if it corresponds to a failure of the first particulate filter 110. For example, it can be determined if the third pressure exceeds a predetermined threshold, the third pressure can be compared with lookup tables (e.g., stored in the controlled 170) to determine if the third pressure corresponds to a failure of the first particulate filter 110.

In yet another embodiment, determining the filtering condition using any of the systems or methods described herein can also be used to monitor an engine. For example, the filtering condition of the first particulate filter 110 determined using any of the embodiments described herein can indicate if an engine emitting the exhaust gas has sustained a failure leading to emission of excessive particulate matter.

For example, the first pressure difference and/or the second pressure difference may be compared with a predetermined engine failure threshold. The engine failure threshold may comprise an absolute value of the first pressure difference and/or the second pressure difference. In some embodiments, the predetermined engine pressure threshold may comprise a rate of change of the first pressure difference and/or the second pressure difference. For example, excessive particulate matter emitted by the engine may cause the first particulate filter 110 and/or the second particulate filter 120 to clog at a much higher rate.

If the first pressure difference and/or the second pressure difference exceeds the predetermined engine failure threshold, it is determined that the engine has failed. For example, one or more pistons rings of the engine may be cracked or worn causing engine oil to flow into and be combusted with the fuel in the cylinders of the engine. This may cause a substantial and rapid increase in particulate matter, causing the first pressure difference and/or the second pressure difference to exceed beyond the predetermined engine failure threshold. The failure of the engine may be indicated to a user, for example by lighting a malfunction indicator lamp (MIL) or generating a fault code.

The SCR system 150 is positioned downstream third pressure sensor 116. The SCR system 150 includes one or more catalysts formulated to selectively reduce the exhaust gas. Any suitable catalyst can be used such as, for example, platinum, palladium, rhodium, cerium, iron, manganese, copper, vanadium based catalyst, any other suitable catalyst, or a combination thereof. The catalyst can be positioned on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The exhaust gas (e.g., diesel exhaust gas) can flow over and about the catalyst such that any NOx gases included in the exhaust gas are further reduced to yield an exhaust gas which is substantially free of carbon monoxide, and NOx gases.

The aftertreatment system 100 can optionally, also include a controller 170. The controller 170 can be in electrical communication with the first pressure sensor 112, the second pressure sensor 114 and the third pressure sensor 116. The controller 170 is configured to receive and interpret signals from the first pressure sensor 112, the second pressure sensor 114 and the third pressure sensor 116 and determine the filtering condition of the first particulate filter 110 and the second particulate filter 120.

The controller 170 can include a processor (e.g., a microcontroller) programmed to interpret signals from the pressure sensors and determine the filtering condition of the filters as described herein. In some embodiments, the controller 170 may comprise a memory including algorithms or programs configured to perform one or more operations of the systems and methods described herein. In some embodiments, the controller 170 can be included in a control circuitry which is in electrical communication with one or more of the components of the aftertreatment system 100 described herein and operable to perform the sensing and control functions described herein. In particular embodiments, the controller 170 can also be configured to receive and interpret data from temperature sensors, NOx sensors, oxygen sensors and/or ammonia sensors, each of which can be included in the aftertreatment system 100.

The controller 170 can include look up tables, algorithms or instructions, which can be stored on a computer readable medium included in the controller 170. The instructions or algorithms on the computer readable medium are executable by a computing device of the controller 170 (e.g., the microprocessor or memory) specifically programmed to determine the filtering condition of the first particulate filter 110 and the second particulate filter 120 based on the pressure data. In particular embodiments, the controller 170 can also include algorithms or look up tables to compare the difference between the second pressure and third pressure with the predetermined threshold to determine whether the first particulate filter 110 is functioning normally or has failed.

In some embodiments, the SCR system 150 included in the aftertreatment system 100 can be positioned upstream of the first particulate filter 110. In still other embodiments, the aftertreatment system 100 can also include multiple branches, each branch including a first particulate filter (e.g., the first particulate filter 110), a second particulate filter (e.g., the second particulate filter 120) and an SCR system (e.g., the SCR system 150). In some embodiments, the aftertreatment system 100 can also include any number of other components. Such components can include, for example an oxidation catalyst (e.g., a diesel oxidation catalyst), an exhaust reductant (e.g., a diesel exhaust fluid such as an aqueous urea solution) injector for facilitating the catalysis of the exhaust gas in the SCR system 150, a mixer for facilitating the mixing of the exhaust gas with the exhaust reductant, an ammonia oxidation catalyst, temperature sensors, NOx sensors, oxygen sensors, ammonia sensors or any other suitable components.

Figure 2:
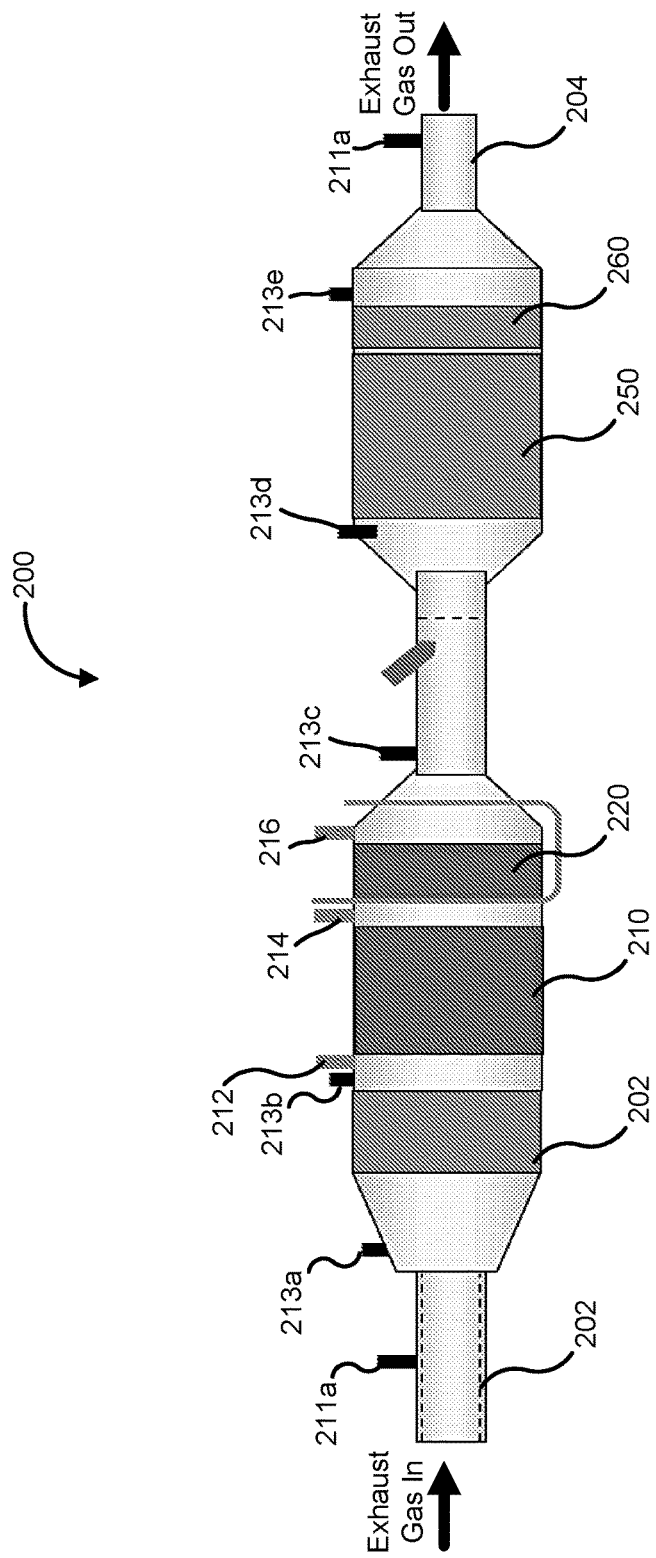
FIG. 2 is a side view of another embodiment of an aftertreatment system that includes a first particulate filter and a second particulate filter positioned downstream of the first particulate filter.

FIG. 2 shows another embodiment of an aftertreatment system 200. The aftertreatment system 200 includes a first oxidation catalyst 206, a first particulate filter 210, a second particulate filter 220, a first pressure sensor 212, a second pressure sensor 214, a third pressure sensor 216, an SCR system 250 and a second oxidation catalyst 260.

The first oxidation catalyst 206 is configured to receive an exhaust gas (e.g., a diesel exhaust gas) from an engine (e.g., a diesel IC engine) via an inlet 202. In such embodiments in which the exhaust gas is a diesel exhaust gas, the first oxidation catalyst 206 can include a diesel oxidation catalyst. A first NOx sensor 211$a$ and a first temperature sensor 213$a$ are positioned upstream of the first oxidation catalyst 206 and configured to measure a concentration of NOx gases in the exhaust gas and temperature of the exhaust gas at the inlet 202 of the aftertreatment system 200, respectively.

The first particulate filter 210 is positioned downstream of the first oxidation catalyst 206. The first particulate filer 210 can be substantially similar to the first particulate filter 110 described with respect to FIG. 1 and therefore, not described in further detail herein. The first pressure sensor 212 is positioned upstream of the first particulate filter 210 and downstream of the first oxidation catalyst 206. The first pressure sensor 212 is configured to measure a first pressure of the exhaust gas upstream of the first particulate filter 210, as described herein with respect to the aftertreatment system 100.

A second temperature sensor 213b is also positioned upstream of the first particulate filter 210 and downstream of the first oxidation catalyst 206. The second temperature sensor 213b is configured to measure a temperature of the exhaust gas before entering the first particulate filter 210.

The second pressure sensor 214 is positioned downstream of the first particulate filter 210. The second pressure sensor 214 is configured to measure a second pressure of the exhaust gas downstream of the first particulate filter 210. A difference between the first pressure and the second pressure can be used to determine a filtering condition (e.g., a filtering efficiency) of the first particulate filter 210, as described before herein with respect to the aftertreatment system 100.

The second particulate filter 220 is positioned downstream of the second pressure sensor 214. The second particulate filter 220 can be substantially similar to the second particulate filter 120 included in the aftertreatment system 100 and therefore, not described in further detail herein.

The third pressure sensor 216 is positioned downstream of the second particulate filter 220 and configured to measure a third pressure of the exhaust gas downstream of the second particulate filter 220. The first pressure, the second pressure and the third pressure can be used to determine a filtering condition of the first particulate filter 210 and the second particulate filter 220 as described with respect to the aftertreatment system 100. Furthermore, a difference between the second pressure and the third pressure can be used to determine a filtering condition of the first particulate filter 210. In one embodiment, a difference between the first pressure and the second pressure exceeding a predetermined threshold corresponds to a failure of the first particulate filter 210, as described herein with respect to the aftertreatment system 100.

A third temperature sensor 213c is positioned downstream of the third pressure sensor 216 and configured to determine a temperature of the exhaust gas exiting the second particulate filter 220. A fourth temperature sensor 213d is positioned downstream of the third temperature sensor 213c and upstream of the SCR system 250. The fourth temperature sensor 213d is configured to measure a temperature of the exhaust gas entering the SCR system 250.

The SCR system 250 is positioned downstream of the fourth temperature sensor 213d. The SCR system 250 includes one or more catalysts configured to reduce the exhaust gas, for example to reduce NOx gases included in the exhaust gas (e.g., in the presence of an exhaust reductant). The SCR system 250 is substantially similar to the SCR system 150 included in the aftertreatment system 100 and therefore, not described in further detail herein.

The second oxidation catalyst 260 is disposed downstream of the SCR system 250. In some embodiments, the second oxidation catalyst 260 can include an ammonia oxidation catalyst. In such embodiments, the second oxidation catalyst 260 is formulated to reduce any residual ammonia included in the exhaust gas exiting the SCR system 250.

A fifth temperature sensor 213e and a second NOx sensor 211b are positioned downstream of the second oxidation catalyst 260, and configured to measure a temperature of the exhaust gas and concentration of NOx in the exhaust gas exiting the SCR system 250, respectively. The clean exhaust gas is then expelled into the atmosphere via an outlet 204.

As described above, the first pressure, the second pressure and the third pressure can be used to determine a filtering condition of the first particulate filter 210 and the second particulate filter 220, as well as a failure of the first particulate filter 210. For example, FIG. 3 shows an exemplary plot of pressure versus time of data of the first pressure $P_1$, the second pressure $P_2$, and the third pressure $P_3$ obtained using the first pressure sensor 212, the second pressure sensor 214 and the third pressure sensor 216 during normal operation of the first particulate filter 210.

Figure 3:
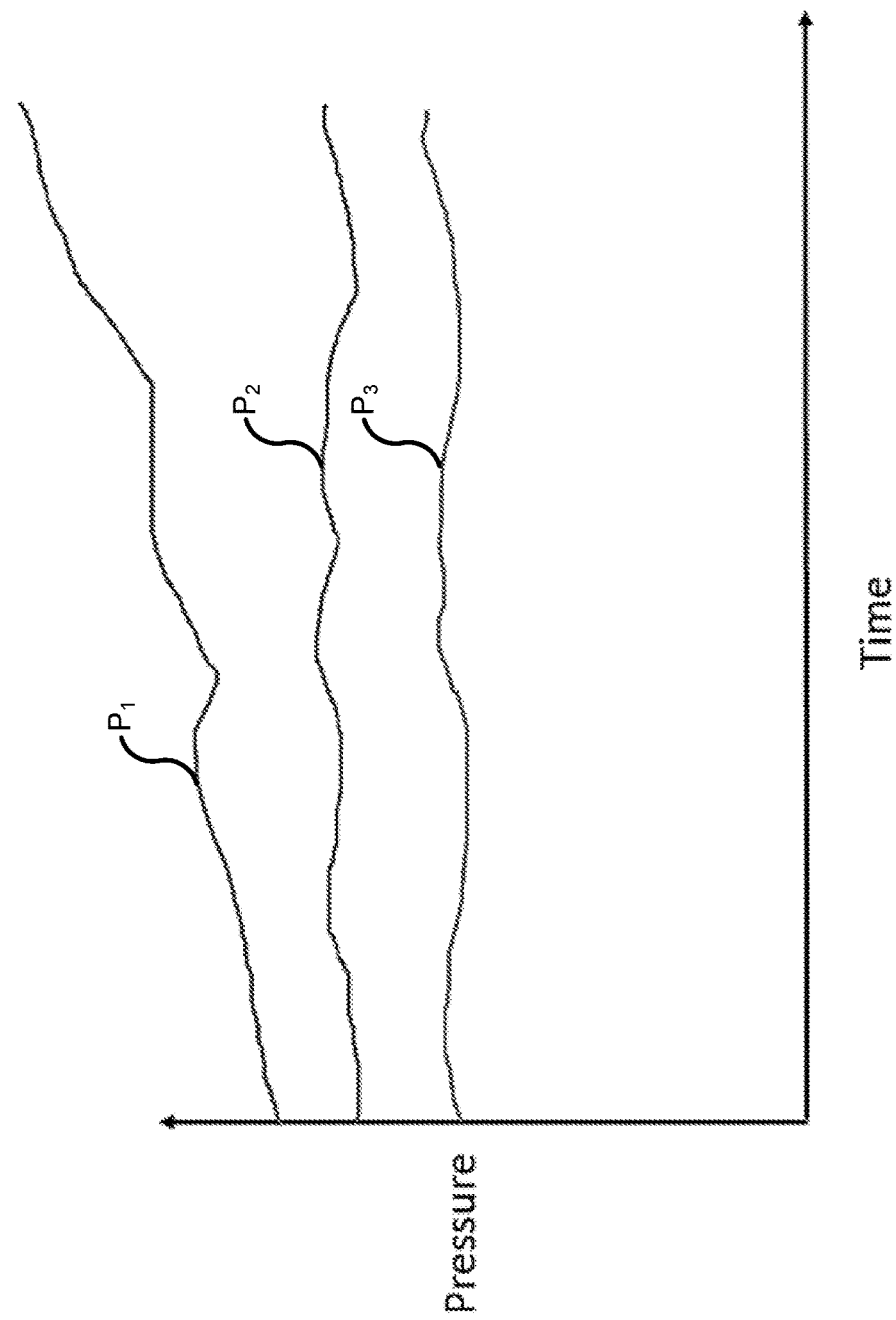
FIG. 3 is a plot of exhaust gas pressure vs time measured by a first pressure sensor upstream of the first particulate filter, downstream of the first particulate filter and upstream of the second particulate filter by a second pressure sensor, and downstream of the second particulate filter by a third pressure sensor of FIG. 2 during normal operation of the first particulate filter.

As seen in FIG. 3, during normal operation the first pressure $P_1$ gradually increases relative to the second pressure $P_2$ as the first particulate filter 210 gradually filters and traps particulate matter over a period of time. This is because as the first particulate filter becomes increasingly clogged, a first backpressure exerted by the first particulate filter 210 on the exhaust gas increases such that a larger first pressure $P_1$ is required to overcome the first backpressure over time. Once the first pressure $P_1$ exceeds a predetermined threshold or a difference between the first pressure and the second pressure exceeds a predetermined threshold, this can indicate that the first particulate filter 210 needs to be replaced or recharged.

In contrast, the difference between the second pressure $P_2$ and the third pressure $P_3$ is relatively small, and remains constant relative to each other during normal operation of the first particulate filter 210 and the second particulate filter 220. This is because the substantially clean exhaust gas emerging from the first particulate filter 210 and entering the second particulate filter 220 contributes minimally to the clogging of the second particulate filter 220. Thus, a second backpressure exerted by the second particulate filter 220 on the exhaust gas entering the second particulate filter 220 at the second backpressure $P_2$ remains relatively unchanged overtime. Therefore, a difference in pressure between the second pressure $P_2$ and the third pressure $P_3$ also remains substantially constant over time during normal operation.

Figure 4:
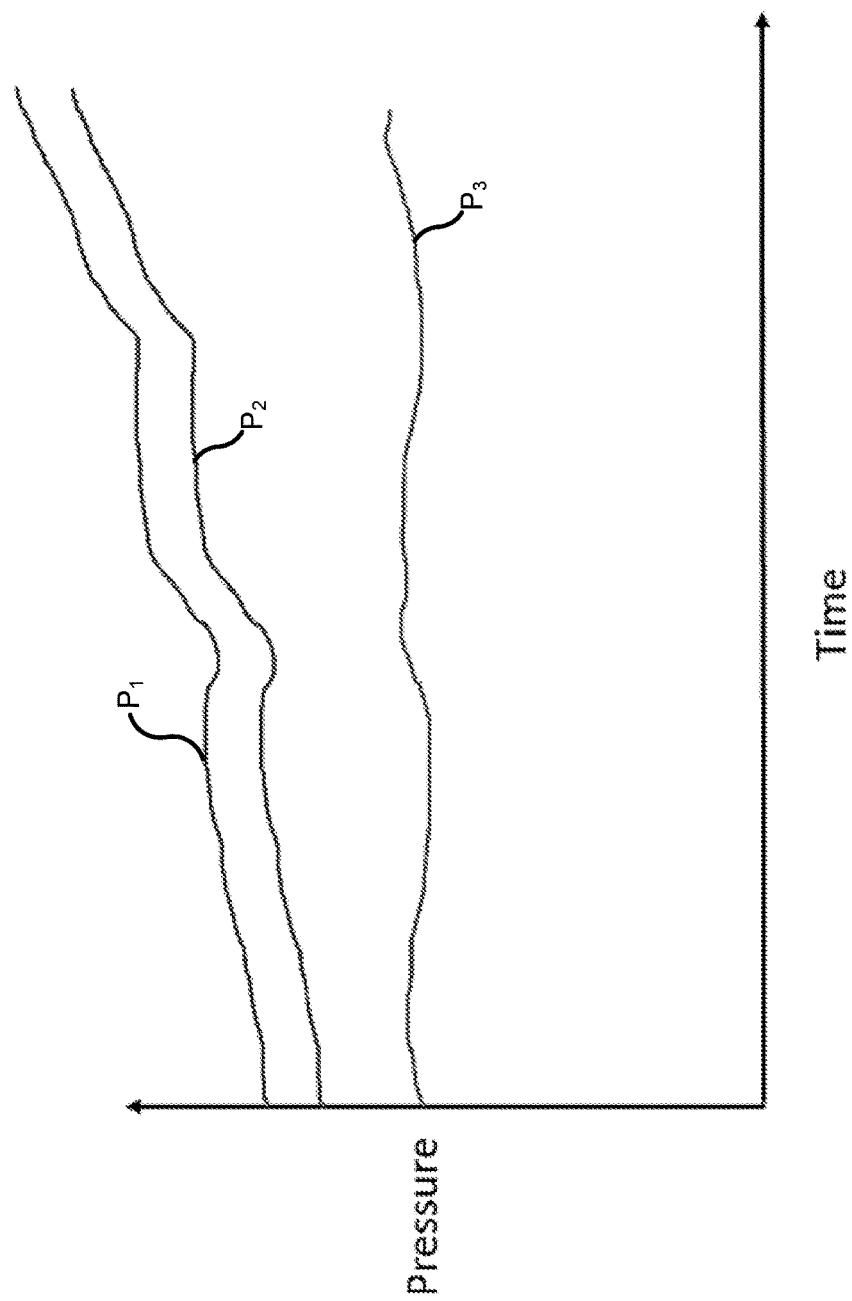
FIG. 4 is a plot of exhaust gas pressure vs time measured by a first pressure sensor upstream of the first particulate filter, downstream of the first particulate filter and upstream of the second particulate filter by a second pressure sensor, and downstream of the second particulate filter by a third pressure sensor of FIG. 2 during a malfunction of the first particulate filter.

FIG. 4 shows an exemplary plot of pressure versus time of the first pressure $P_1$, the second pressure $P_2$ and the third pressure $P_3$ overtime during a failure of the first particulate filter 210 because of a crack in the first particulate filter 210. The crack allows the exhaust gas to flow relatively unimpeded through the first particulate filter 210. Because of this, a difference in pressure between the first pressure $P_1$ and the second pressure $P_2$ is relatively small and remains relatively constant. Also, a relatively large portion of the particulate matter remains entrained within the exhaust gas as it exits the second particulate filter 220 via the crack.

Since a relatively large portion of the particulate matter (e.g., an amount of particulate matter which exceeds emission regulations) flows into the second particulate filter 220 during a failure of the first particulate filter 210, the particulate matter is filtered by the second particulate filter 220. As the second particulate filter 220 filters or traps exceeding amounts of the particulate matter over time, it also gets increasingly clogged. This results in an increase in the second backpressure exerted by the second particulate filter 220 on the exhaust gas. Because of this, an increasingly higher second pressure $P_2$ (and thereby a higher first pressure $P_1$) is required by the exhaust gas to overcome the second backpressure. Thus, the second pressure $P_2$ and thereby, a difference between the second pressure $P_2$ and the third pressure $P_3$, increases overtime. In particular embodiments, exceeding of the difference between the second pressure $P_2$ and the third pressure $P_3$ beyond a predetermined threshold corresponds to a failure of the first exhaust filter 210. In this manner, a filtering condition and failure status of the first particulate filter 210 (e.g., a diesel particulate filter) can be solely determined based on pressure measurements without requiring particulate monitoring sensors.

Figure 5:
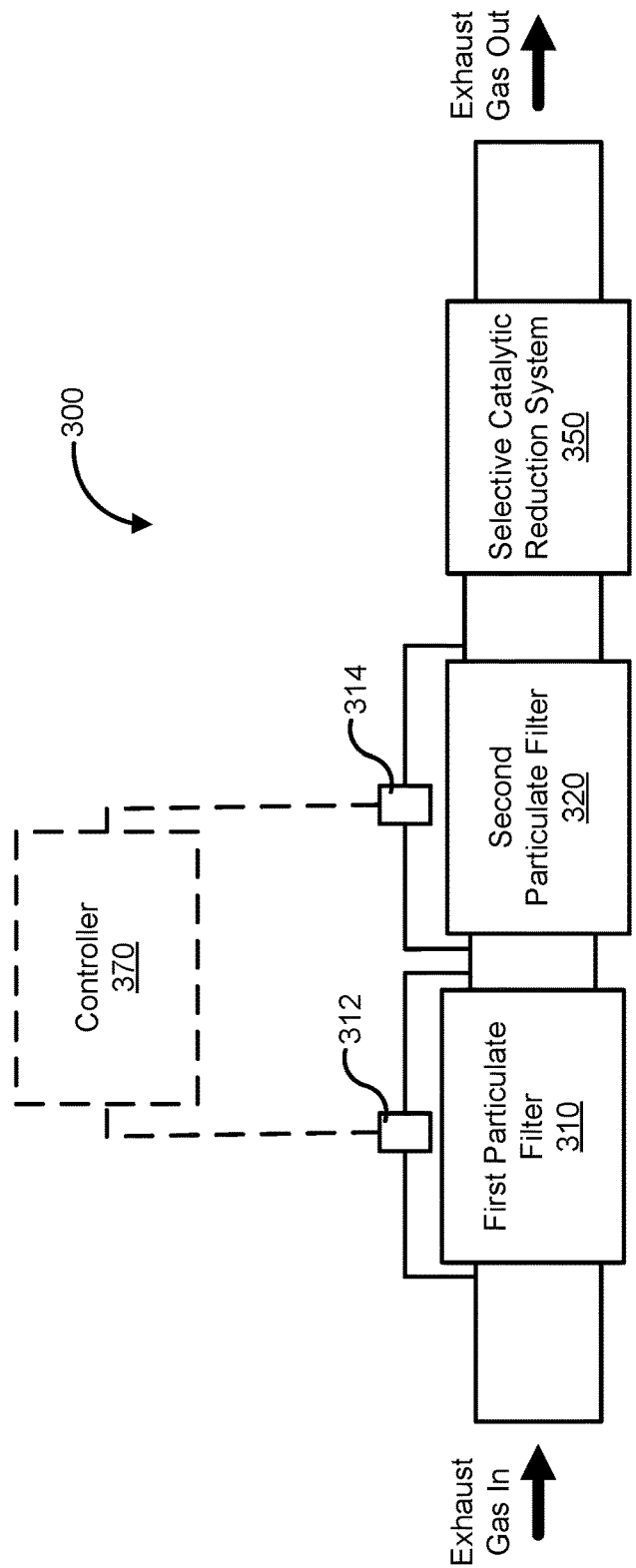
FIG. 5 is a schematic block diagram of another embodiment of an aftertreatment system that includes the use of a plurality of differential pressure sensors.

FIG. 5 shows another embodiment of an aftertreatment system 300 that includes differential pressure sensors. The aftertreatment system 300 includes a first particulate filter 310, a second particulate filter 320, an SCR system 350, a first differential pressure sensor 312, a second differential pressure sensor 314, and optionally a controller 370. The first particulate filter 310, the second particulate filter 320, the SCR system 350 and the controller 370 are substantially similar to the first particulate filter 110, the second particulate filter 120, the SCR system 150 and the controller 170 and therefore, not described in further detail herein.

A first differential pressure sensor 312 and a second differential pressure sensor 314 are positioned across the first particulate filter 310 and the second particulate filter 320, respectively. The first differential pressure sensor 312 is configured to measure a first pressure difference corresponding to the difference in pressure between the first pressure and the second pressure. Similarly, the second differential pressure sensor 314 is configured to measure a second pressure difference corresponding to the difference in pressure between the second pressure and the third pressure.

The first pressure difference and the second pressure difference can correspond to a filtering condition of the first particulate filter 310. In some embodiments, the second pressure difference exceeding a predetermined threshold can correspond to a failure of the first particulate filter 310, as described with respect to the aftertreatment system 100.

Figure 6:
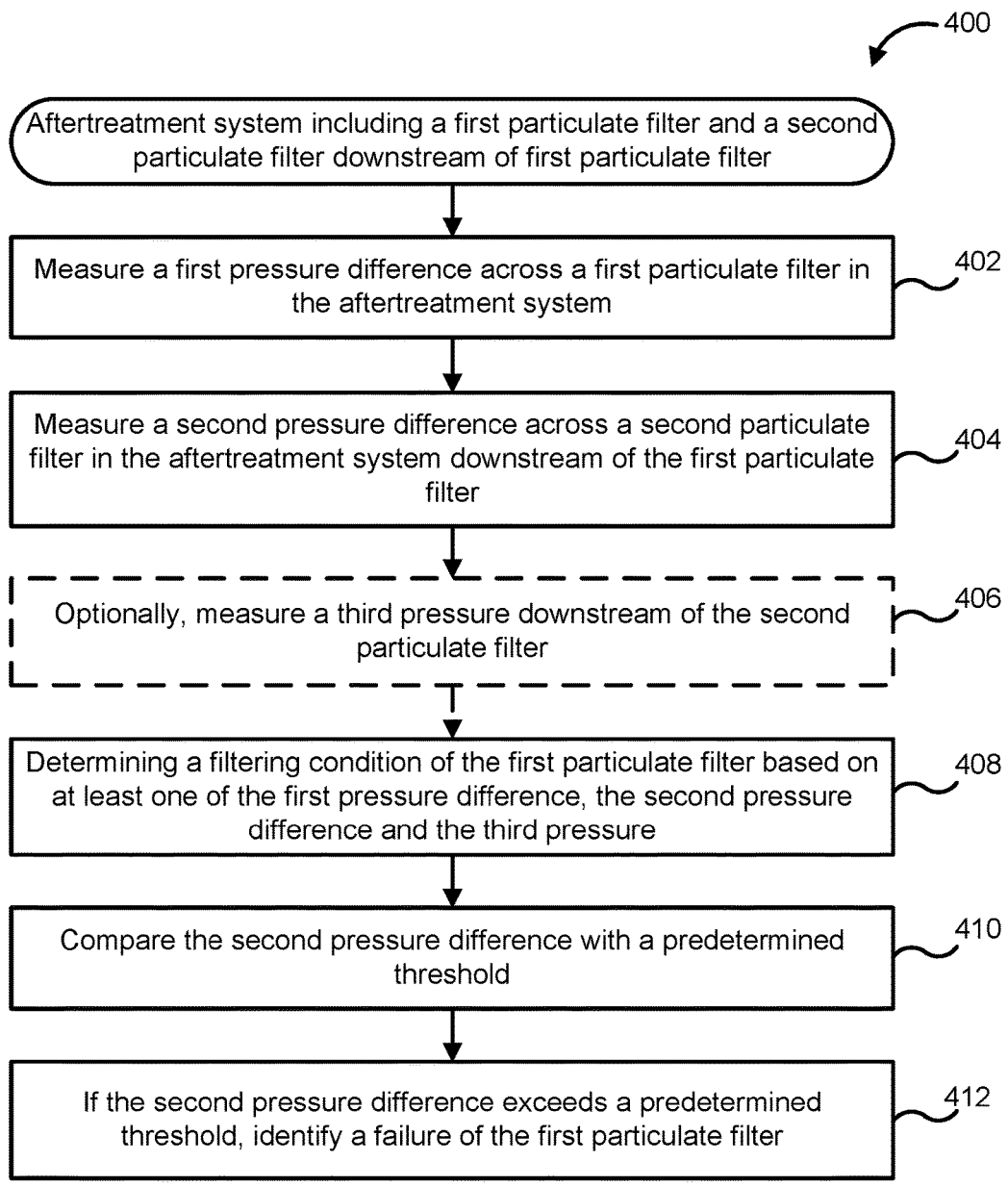
FIG. 6 is a schematic flow diagram of one embodiment of a method for monitoring filtering condition of an aftertreatment system.

FIG. 6 is a schematic flow diagram of an exemplary method 400 for monitoring a filtering condition and determining a failure of a first particulate filter included in an aftertreatment system. The aftertreatment system also includes a second particulate filter disposed downstream of the first particulate filter. The aftertreatment system can comprise, for example, the aftertreatment system 100, 200 or any other aftertreatment system described herein.

The method 400 includes measuring a first pressure difference across the first particulate filter in the aftertreatment system at 402. For example, a first differential pressure sensor can be positioned across the first particulate filter and configured to measure the first pressure difference. In other embodiments, a first pressure sensor (e.g., the first pressure sensor 112 or 212, as described herein) can be positioned upstream of the first particulate filter (e.g., the first particulate filter 110 or 210, as described herein) and configured to measure a first pressure of an exhaust gas (e.g., a diesel exhaust gas) upstream of the first particulate pressure. A second pressure sensor (e.g., the second pressure sensor 114 or 214, as described herein) can be positioned downstream of the first particulate filter and upstream of the second particulate filter and configured to measure a second pressure of the exhaust gas after exiting the first particulate filter but before entering the second particulate filter. A difference in the first pressure and the second pressure will correspond to the first pressure difference.

A second pressure difference is measured across the second particulate filter positioned downstream of the first particulate filter at 404. For example, a second differential pressure sensor can be positioned across the second particulate filter and configured to measure the second pressure difference. In other embodiments, a third pressure sensor (e.g., the third pressure sensor 116 or 216, as described herein) can be positioned downstream of the second particulate filter and configured to measure the third pressure of the exhaust gas after flowing through the second particulate filter. A difference between the second pressure as described above, and the third pressure will correspond to the second pressure difference.

Optionally, a third pressure is measured downstream of the second particulate filter, at 406. For example, a third pressure sensor (e.g., the third pressure sensor 116 or 216) can be positioned downstream of the second particulate filter to monitor the third pressure.

A filtering condition of the first particulate filter is determined based on the first pressure difference the second pressure difference and/or the third pressure at 408, as described with respect to the aftertreatment system 100 and 200. In some embodiments, the first pressure difference and the second pressure difference may be used to determine the filtering condition of the first particulate filter (e.g., the first particulate filter 110/210/310).

At 410, the second pressure difference is compared with a predetermined threshold. If the second pressure difference exceeds a predetermined threshold, a failure of the first particulate filter is identified, at 412, as described with respect to the aftertreatment systems 100 and 200. In other embodiments, the method 400 can determine if a second pressure downstream of the first particulate filter and upstream of the second particulate filter is in a predetermined range. If the second pressure is in the predetermined range, the method 400 determines if the third pressure corresponds to a failure of the first particulate filter (e.g., exceeds a predetermined threshold value, or compared with a lookup table to storing values of the third pressure at which the first particulate filter is considered to fail).

In one embodiment, an indication of the failure of the first particulate filter is provided to a user. For example, the aftertreatment system can be included in a system operated by the user (e.g., a vehicle). An audio/visual indication (e.g., an alarm, a beep, a visual indicator on a dashboard, control panel, console, lighting an MIL, etc.) can be provided to the user to indicate the failure of the first particulate filter. In some embodiments, a fault code can be generated by a computer system (e.g., an embedded computer) of an engine which includes the aftertreatment system. For example, a check engine light can turn on corresponding to a fault code which indicates that the first particulate filter has failed.

Figure 7:
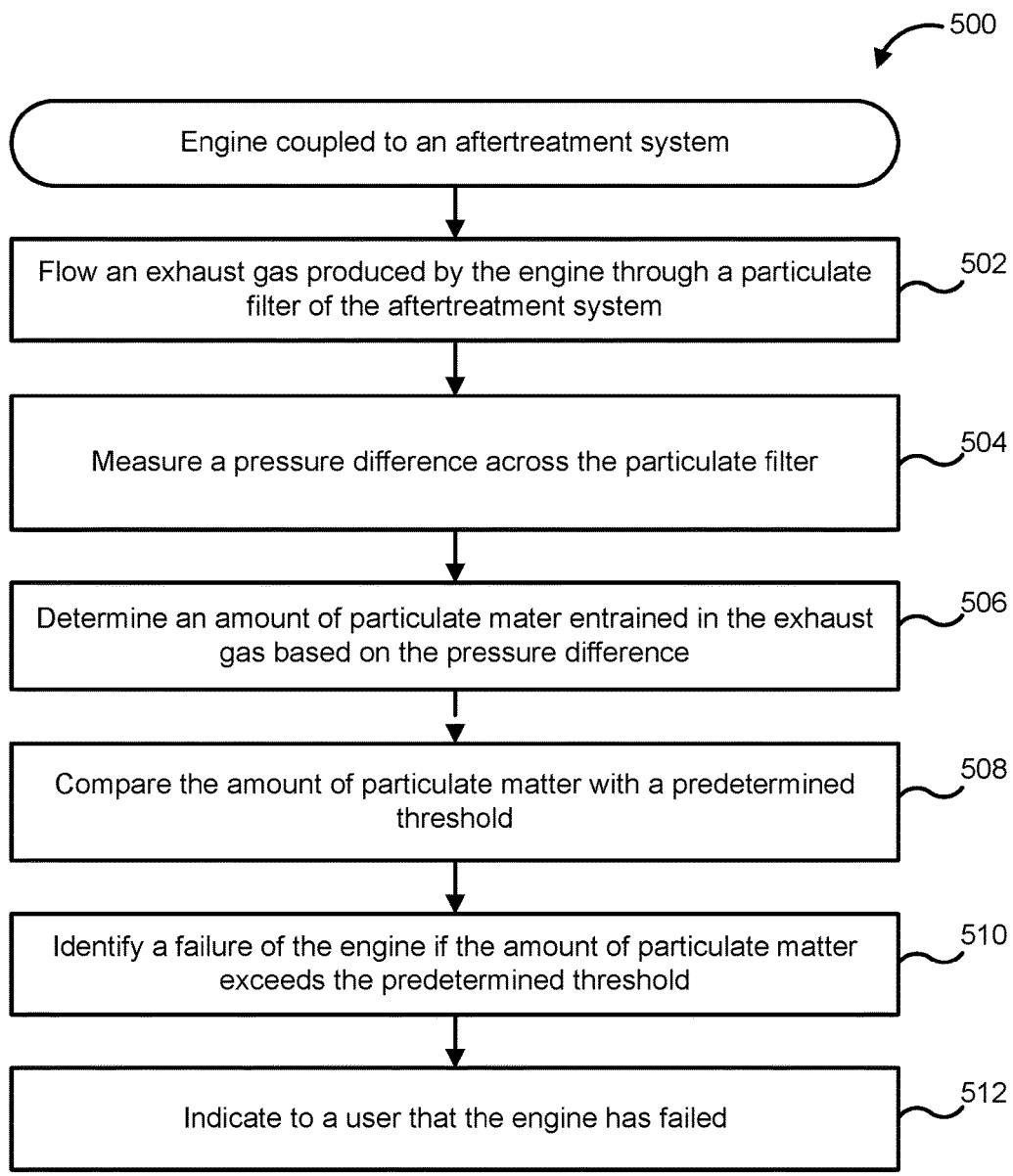
FIG. 7 is a schematic flow diagram of an example method for identifying a failure of an engine.

A pressure difference across a single particulate filter can also be used to determine an amount of particulate matter as an indicator of engine failure (e.g., a diesel engine failure). FIG. 7 is an example a schematic flow diagram of a method for determining a failure of an engine fluidly coupled to an aftertreatment system (e.g., the aftertreatment system 100/200/300). An exhaust gas produced by the engine is communicated through a particulate filter included in an aftertreatment system at 502. The aftertreatment system can include the aftertreatment system 100 or any other aftertreatment system described herein that includes only one particulate filter (e.g., the first particulate filter 110 or the second particulate filter 120). The aftertreatment system is fluidly coupled to the engine to receive the exhaust gas produced by the engine and treat the exhaust gas.

A pressure difference across the particulate filter is measured at 504. In one embodiment, the pressure difference across the particulate filter can be measured using a differential pressure sensor, as described before herein. In other embodiments, a first pressure upstream of the particulate filter and a second pressure downstream of the particulate filter is measured. A difference between the first pressure and the second pressure will correspond to a pressure difference across the particulate filter. A first pressure sensor can be positioned upstream of the particulate filter and a second pressure sensor can be positioned downstream of the particulate filter to measure the first pressure and the second pressure, respectively.

An amount of particulate matter entrained in the exhaust gas is determined based on the pressure difference at 506. The amount of particulate matter is then compared with a predetermined threshold at 508. In some embodiments, the amount of particulate matter can be a quantitative amount. For example, the pressure difference can be compared with lookup tables, or algorithms can be used to determine a quantitative amount of the particulate matter. The quantiative amount can then be compared with the predetermined threshold, for example a threshold amount of the particulate matter.

In other embodiments, the amount of particulate matter can be a qualitative amount. For example, the predetermined threshold can correspond to a particular value of the pressure difference. If the pressure difference is below a predetermined threshold value, it qualitatively indicates that the amount of particulate matter is within the predetermined threshold. On the other hand if the pressure difference exceeds the predetermined threshold value, this indicates that the amount of particulate matter has exceeded the predetermined threshold.

If the amount of particulate matter exceeds the predetermined threshold, a failure of the engine is identified at 510. In this manner, failure of the engine, for example a piston, a piston ring, or any other system associated with the engine (e.g., an exhaust gas recirculation system, a fueling system, etc.) which can lead to an increase in particulate matter emissions beyond the predetermined threshold, can be determined using the method described herein. The failure of the engine may be indicated to a user at 512. For example, a malfunction indicator lamp (MIL) may be lighted or a fault code may be generated so as to alert the user that the engine has failed.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method for monitoring filtering condition in an aftertreatment system, comprising:
    measuring a first pressure difference across a first particulate filter in the aftertreatment system;
    measuring a second pressure difference across a second particulate filter in the aftertreatment system, the second particulate filter positioned downstream of the first particulate filter and upstream of a selective catalytic reduction system;
    determining a filtering condition of the first particulate filter based on the first pressure difference and the second pressure difference;
    measuring a third pressure downstream of the second particulate filter and upstream of the selective catalytic reduction system;
    in response to the first pressure difference being within a predetermined range, determining if an absolute value of the third pressure exceeds a predetermined threshold;
    in response to the absolute value of the third pressure exceeding the predetermined threshold, determining that the first particulate filter has failed; and
    generating a fault code indicating that the first particulate filter has failed.

2. The method of claim 1, further comprising:
    comparing the second pressure difference with a predetermined threshold; and when the second pressure difference exceeds the predetermined threshold, identifying a failure of the first particulate filter.

3. The method of claim 2, further comprising:
providing an indication to a user of the failure of the first particulate filter.

4. The method of claim 1, wherein the first pressure difference and the second pressure difference are measured using differential pressure sensors.

5. The method of claim 1, wherein the first pressure difference is determined by measuring a first pressure upstream of the first particulate filter, measuring a second pressure downstream of the first particulate filter and upstream of the second particulate filter, and determining a difference between the first pressure and the second pressure.

6. The method of claim 5, wherein the second pressure difference is determined by determining a difference between the second pressure and the third pressure.

7. The method of claim 1, further comprising:
comparing at least one of the first pressure difference and the second pressure difference with a predetermined engine failure threshold; and
when at least one of the first pressure difference and the second pressure difference exceeds the predetermined engine failure threshold, indicating to a user that the engine has failed.

8. An aftertreatment system, comprising:
a first particulate filter configured to receive an exhaust gas containing particulate matter and filter the exhaust gas to remove at least a portion of the particulate matter from the exhaust gas, the exhaust gas having a first pressure upstream of the first particulate filter and a second pressure downstream of the first particulate filter; and
a second particulate filter positioned downstream of the first particulate filter, the second particulate filter configured to receive at least a portion of the filtered exhaust gas from the first particular filter and filter any remaining particulate matter from the exhaust gas, the exhaust gas having a third pressure downstream of the second particulate filter;
a selective catalytic reduction system positioned downstream of the second particulate filter, the third pressure being upstream of the selective catalytic reduction system; and
a controller configured to:
determine a first pressure difference between the first pressure and the second pressure;
determine a second pressure difference between the second pressure and the third pressure;
in response to the first pressure difference being within a predetermined range, determining if an absolute value of the third pressure exceeds a predetermined threshold;
in response to the absolute value of the third pressure exceeding the predetermined threshold, determining that the first particulate filter has failed; and
generate a fault code indicating that the first particulate filter has failed.

9. The aftertreatment system of claim 8, further comprising:
a first pressure sensor positioned upstream of the first particulate filter and configured to measure the first pressure;
a second pressure sensor positioned downstream of the first particulate filter and upstream of the second particulate filter, the second pressure sensor configured to measure the second pressure; and
a third pressure sensor positioned downstream of the second particulate filter and upstream of the selective catalytic reduction system, the third pressure sensor configured to measure the third pressure.

10. The aftertreatment system of claim 8, wherein a difference between the second pressure and the third pressure corresponds to a filtering condition of the first particulate filter.

11. The aftertreatment system of claim 10, wherein the difference between the second pressure and the third pressure exceeding a predetermined threshold corresponds to a failure of the first particulate filter.

12. The aftertreatment system of claim 10, further comprising:
a first differential pressure sensor configured to measure a first pressure difference across the first particulate filter; and
a second differential pressure sensor configured to measure a second pressure difference across the second particulate filter.

13. The aftertreatment system of claim 8, wherein the second particulate filter has a second cross-sectional area which is smaller than a first cross-sectional area of the first particulate filter.

14. The aftertreatment system of claim 8, wherein the second particulate filter has a second cross-sectional area which is equal to a first cross-sectional area of the first particulate filter.

15. The aftertreatment system of claim 8, wherein each of the first particulate filter and the second particulate filter are catalyzed.

16. The aftertreatment system of claim 9, wherein the controller is operatively coupled to each of the first pressure sensor, the second pressure sensor and the third pressure sensor, the controller configured to:
determine a filtering condition of the first particulate filter and the second particulate filter from the first pressure difference and the second pressure difference.

17. The aftertreatment system of claim 16, wherein the controller is further configured to:
determine if the second pressure difference exceeds a predetermined threshold; and
when the second pressure difference exceeds the predetermined threshold, indicate to a user that the first particulate filter has failed.

18. The aftertreatment system of claim 12,
wherein the controller is operatively coupled to each of the first differential pressure sensor and the second differential pressure sensor, the controller configured to:
interpret the first pressure difference and the second pressure difference so as to determine a filtering condition of the first particulate filter and the second particulate filter.

19. The aftertreatment system of claim 18 wherein the controller is further configured to:
determine if the second pressure difference exceeds a predetermined threshold; and
when the second pressure difference exceeds the predetermined threshold, indicate to a user that the first particulate filter has failed.

20. A method for monitoring filtering condition in an aftertreatment system, comprising:
measuring a first pressure upstream of a first particulate filter of the aftertreatment system;

measuring a second pressure downstream of the first particulate filter and upstream of a second particulate filter of the aftertreatment system; and measuring a third pressure downstream of the second particulate filter and upstream of a selective catalytic reduction system positioned downstream of the second particulate filter;

determining if at least one of the first pressure, the second pressure, and a difference between the first pressure and the second pressure is within a predetermined range;

when at least one of the first pressure, the second pressure, and a difference between the first pressure and the second pressure is within the predetermined range, determining if an absolute value of the third pressure exceeds a predetermined threshold; and in response to the absolute value of the third pressure exceeding the predetermined threshold, determining that the first particulate filter has failed; and generating a fault code indicating that the first particulate filter has failed.

21. The method of claim 20, further comprising:

determining a second pressure difference between the second pressure and the third pressure;

determining if the second pressure difference exceeds a predetermined threshold; and in response to the second pressure difference exceeding the predetermined threshold, indicating to a user that the first particulate filter has failed.

22. A control circuitry for monitoring a filtering condition of an aftertreatment system, the control circuitry comprising:

a controller configured to be operatively coupled to the aftertreatment system, the controller configured to:

measure a first pressure upstream of a first particulate filter of the aftertreatment system;

measure a second pressure downstream of the first particulate filter and upstream of a second particulate filter of the aftertreatment system; and measure a third pressure downstream of the second particulate filter and upstream of a selective catalytic reduction system positioned downstream of the second particulate filter;

determine if at least one of the first pressure, the second pressure, and a difference between the first pressure and the second pressure is within a predetermined range;

when at least one of the first pressure, the second pressure, and a difference between the first pressure and the second pressure is within the predetermined range, determine if an absolute value of the third pressure exceeds a predetermined threshold; and in response to the absolute value of third pressure exceeding the predetermined threshold, determine that the first particulate filter has failed; and generate a fault code indicating that the first particulate filter has failed.

23. The control circuitry of claim 22, wherein the controller is further configured to:

determine a second pressure difference between the second pressure and the third pressure;

determine if the second pressure difference exceeds a predetermined threshold; and in response to the second pressure difference exceeding the predetermined threshold, indicate to a user that the first particulate filter has failed.

* * * * *